(12) United States Patent
Stapleton

(10) Patent No.: US 11,094,224 B2
(45) Date of Patent: Aug. 17, 2021

(54) SEPARABLE IDENTIFICATION ASSEMBLY

(71) Applicant: David Stapleton, Boston, MA (US)

(72) Inventor: David Stapleton, Boston, MA (US)

(*) Notice: Subject to any disclaimer, the term of this patent is extended or adjusted under 35 U.S.C. 154(b) by 489 days.

(21) Appl. No.: 15/941,107

(22) Filed: Mar. 30, 2018

(65) Prior Publication Data

US 2019/0304345 A1 Oct. 3, 2019

(51) Int. Cl.
| | | |
|---|---|---|
| *A01K 27/00* | (2006.01) | |
| *G09F 3/02* | (2006.01) | |
| *G09F 3/08* | (2006.01) | |
| *A01K 11/00* | (2006.01) | |

(52) U.S. Cl.
CPC ............. *G09F 3/02* (2013.01); *A01K 11/00* (2013.01); *A01K 27/001* (2013.01); *G09F 3/08* (2013.01)

(58) Field of Classification Search
USPC ............... 119/863, 858–860, 856; D30/155; 40/303, 300, 304, 640, 665; 2/311, 338; 283/74, 80, 94
See application file for complete search history.

(56) References Cited

U.S. PATENT DOCUMENTS

| | | | | | |
|---|---|---|---|---|---|
| 1,508,963 | A | * | 9/1924 | Dorf ................. | A44B 11/005 224/163 |
| 2,255,999 | A | * | 9/1941 | Kuehner ............ | A44C 5/0015 63/19 |
| 3,043,037 | A | * | 7/1962 | Lesser .............. | A44B 11/005 40/640 |
| 3,148,426 | A | * | 9/1964 | Lesser .............. | A44B 11/005 24/3.7 |
| 3,585,743 | A | * | 6/1971 | Jeffers ............... | A01K 27/006 40/665 |
| 3,769,726 | A | * | 11/1973 | Spence .............. | A44C 5/0015 40/665 |
| 4,113,157 | A | * | 9/1978 | Woodbury ......... | A44B 11/005 206/37 |
| 4,174,553 | A | * | 11/1979 | Schrougham ..... | A01K 27/005 119/863 |
| 4,258,914 | A | * | 3/1981 | Lalli ................. | A63B 21/065 482/55 |
| 6,305,329 | B1 | | 10/2001 | Levy, Jr. | |
| 7,861,443 | B2 | | 1/2011 | Hill | |
| 7,877,844 | B2 | | 2/2011 | Nichols et al. | |
| 8,151,419 | B2 | | 4/2012 | Rolain et al. | |
| 8,356,579 | B2 | | 1/2013 | Sullivan | |
| 8,413,357 | B1 | | 4/2013 | Hagen et al. | |
| 8,726,850 | B2 | | 5/2014 | Rosenquist et al. | |
| 9,675,045 | B2 | | 6/2017 | Bloom et al. | |
| 9,861,080 | B1 | * | 1/2018 | Hathway ........... | A01K 11/008 |

(Continued)

FOREIGN PATENT DOCUMENTS

| | | |
|---|---|---|
| BR | PI 0700866-4 A | 10/2008 |
| CN | 104145842 | 11/2014 |
| WO | 2008112065 | 9/2008 |

*Primary Examiner* — Andrea M Valenti
(74) *Attorney, Agent, or Firm* — Lambert Shortell & Connaughton; David J. Connaughton, Jr.; Justin P. Tinger

(57) ABSTRACT

An identification assembly is provided having a tag assembly and a bracket assembly, the tag assembly comprising a front plate rotatably fixed to a tag body. In accordance with embodiments, the front plate has two identification surfaces and the tag body has one identification surface, and the tag assembly is configured to removably receive the bracket assembly.

6 Claims, 12 Drawing Sheets

(56) References Cited

U.S. PATENT DOCUMENTS

| | | | |
|---|---|---|---|
| 2003/0217703 A1* | 11/2003 | Kiss | A46B 5/00 |
| | | | 119/863 |
| 2005/0115122 A1* | 6/2005 | Fishman | A44C 5/0015 |
| | | | 40/304 |
| 2005/0145203 A1* | 7/2005 | Wang | A44B 11/25 |
| | | | 119/865 |
| 2006/0032464 A1 | 2/2006 | Newman | |
| 2007/0034165 A1 | 2/2007 | Yang | |
| 2007/0221140 A1 | 9/2007 | Warren et al. | |
| 2007/0283901 A1 | 12/2007 | LeVally | |
| 2009/0038670 A1 | 2/2009 | Shu | |
| 2009/0064472 A1 | 3/2009 | Olsen | |
| 2009/0288616 A1 | 11/2009 | Csenar | |
| 2012/0073517 A1 | 3/2012 | Dukes | |
| 2013/0227824 A1* | 9/2013 | Szellos | A44B 11/258 |
| | | | 24/190 |
| 2014/0157554 A1 | 6/2014 | Hammond et al. | |
| 2014/0346072 A1* | 11/2014 | Jacobson | B65B 5/04 |
| | | | 206/438 |
| 2018/0098523 A1* | 4/2018 | Basom | G06Q 50/24 |

\* cited by examiner

*Fig. 1*
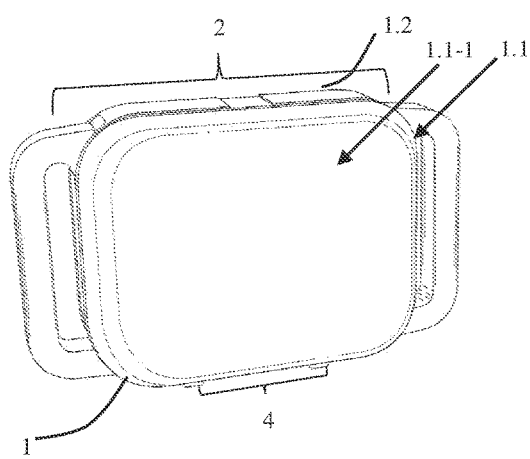
*Fig. 1A*
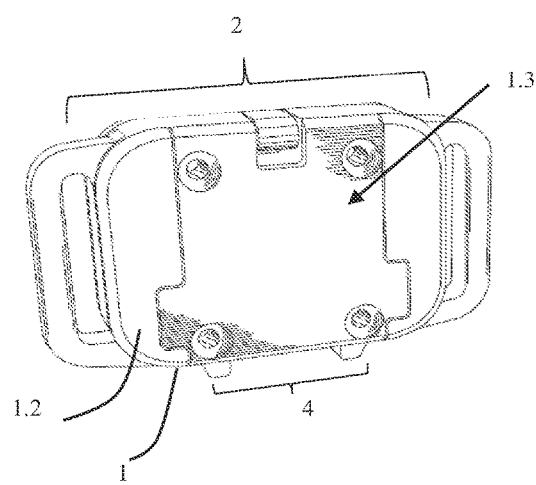
*Fig. 1C*
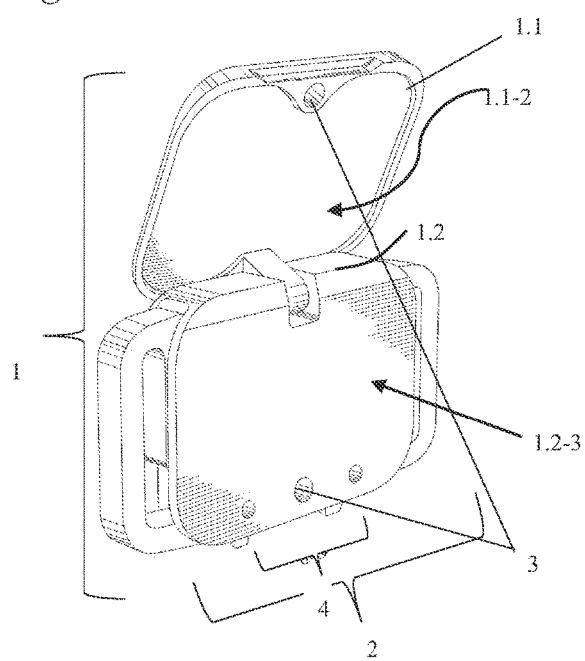
*Fig. 1B*

SEPARABLE IDENTIFICATION ASSEMBLY

FIELD OF INVENTION

The present disclosure is directed to an identification assembly, and more specifically, to an animal identification assembly that has a plurality of identification surfaces within a single tag assembly.

SUMMARY OF INVENTION

In accordance with aspects and embodiments, an identification assembly is provided comprising a tag assembly and a bracket assembly, wherein the tag assembly comprising a front plate rotatably fixed to a tag body, wherein the front plate has two identification surfaces and the tag body has one identification surface, and the tag body is configured to removably receive the bracket assembly.

In accordance with embodiments, the bracket assembly comprises two brackets, each comprising a tag receiving portion having a top surface and a bottom surface, wherein the tag receiving portion is configured to be received by a bracket slot defined by the tag body.

In accordance with embodiments, the tag body may further comprise a bracket stop that protrudes into each of the bracket slots defined by the tag body, the bracket stop configured to abut the top surface of the tag body receiving portion of each bracket.

In accordance with embodiments, the tag body may further comprise levers configured to protrude into each of the bracket slots and engage a bottom surface of the tag receiving portion of the bracket.

In accordance with embodiments, the levers may be configured to be disengageable from the bottom surface of the tag receiving portion of each of the brackets in the bracket slots such that the bracket can be removed from the tag body.

In accordance with embodiments, the identification surfaces may be engravable surfaces. In accordance with aspects and embodiments of the disclosure, a collar assembly is provided comprising a band having a first end and a second end and an identification assembly, wherein the identification assembly comprises three identification surfaces and is configured to be removably received between the first end of the band and the second end of the band.

In accordance with embodiments, the collar may further comprise a bracket assembly.

In accordance with embodiments, the bracket assembly may comprise two brackets, each bracket having a collar receiving portion and a tag receiving portion.

In accordance with embodiments, the identification assembly may comprise a tag assembly having a front plate rotatably secured to a tag body.

In accordance with embodiments, the first plate may comprise a first identification surface and a second identification surface, where the first identification surface is opposite the second identification surface.

In accordance with embodiments, the tag body may have a third identification surface.

In accordance with embodiments, the front plate may be removably fixed to the tag body.

In accordance with aspects and embodiments, a tag assembly is provided comprising a front plate rotatably fixed to a tag body and a backplate affixed to the tag body, wherein the tag assembly further comprises three identification surfaces.

In accordance with embodiments, the identification surfaces may be engravable surfaces.

In accordance with embodiments, the front plate may comprise a first identification surface and a second identification surface, wherein the first identification surface is opposite the second identification surface.

In accordance with embodiments, the tag body may comprise a third identification surface opposite the back plate.

In accordance with embodiments, the front plate may comprise a lip extending from the second identification surface.

In accordance with embodiments, identification surfaces may not contact one another. In accordance with embodiments, the front plate may be removably fixed to the tag body.

BRIEF DESCRIPTION OF THE DRAWINGS

FIG. 1A provides a front view of an identification assembly in accordance with aspects and embodiments of the present invention.

FIG. 1B provides a front view of an identification assembly in accordance with embodiments of the present invention.

FIG. 1C provides a back view of an identification assembly in accordance with embodiments of the present invention.

DETAILED DESCRIPTION

Figure 2:
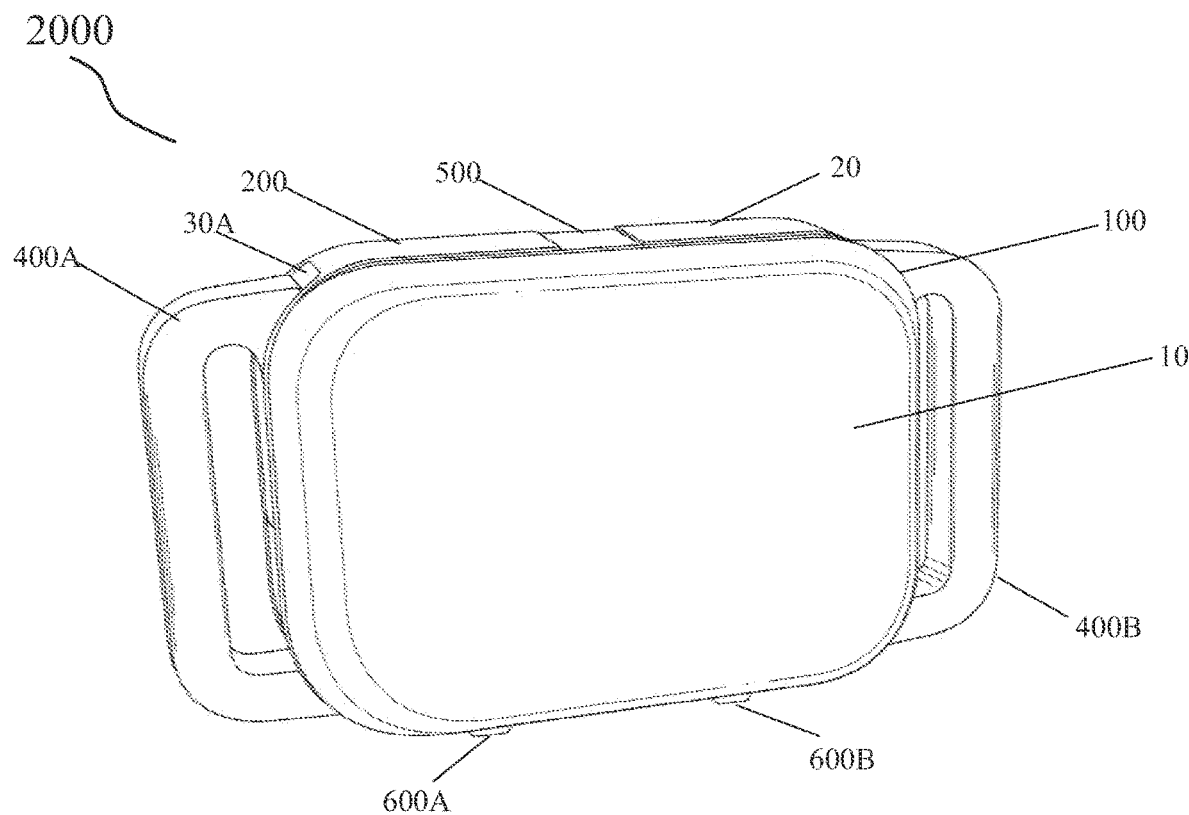
FIG. 2 provides a front view of an identification assembly in accordance with aspects embodiments of the present invention.

Many pet owners desire to equip their pet with identifying and pertinent information regarding the pet's name, the owners' information, any relevant health information about the animal, and other important information useful in case of an emergency. In addition, many municipalities require animals that walk on public property to display municipal pet license numbers and proof of vaccinations. The result is that often an owner must equip their pet's collar with multiple identification tags. These tags can be cumbersome to the animal and generate a nuisance jingling sound when the animal moves about. In addition to causing noise, when more than one tag is present on an animal's collar, the tags rub and bang into one another which over time causes a degradation of legibility of the information presented on them. Moreover, pet owners often seek to provide fashionable accessories for their pets, and some owners enjoy changing out their pet's accessories frequently. Thus, accessories that are both capable of conveying information and have interchangeable features are desirable.

The present disclosure is thus directed to an animal identification assembly that advantageously stores all necessary and desired animal information without the undesired jingling and degradation of information and, also allows the owner to swap out the band portion of the assembly as frequently as desired.

The identification assemblies of the present disclosure have a tag assembly having a plurality of surfaces capable of displaying information. The tag assembly is constructed and arranged such that each of the surfaces do not contact one another and thus the degradation of information displayed on each of the surfaces resulting from contact with the other surfaces is avoided. Moreover, because the surfaces do not contact each other, the tag assembly is silent.

In a first embodiment, identification assembly 1000 is provided, as shown in FIGS. 1A-1C. Identification assembly 1000 has tag assembly 1, bracket assembly 2, latch assembly 3, and lever assembly 4. Tag assembly 1 has front plate 1.1, tag body 1.2, and back plate 1.3. As shown in FIG. 1B, front plate 1.1 is rotatably connected to tag body 1.2. As shown in FIG. 1C, back plate 1.3 is permanently affixed to tag body 1.2. Front plate 1.1 has surface 1.1-1 and surface 1.1-2. Tag body 1.2 has surface 1.2-3. Surfaces 1.1-1, 1.1-2, and 1.1-3 may be display surfaces. As used herein, a display surface is any surface capable of displaying a design or information and the phrase "display surface" may be used interchangeably with the phrase "identification surface." The identification surfaces of the present disclosures need only be capable of displaying information and may, for example, be left blank. In accordance with aspects and embodiments, surfaces may, alternatively, display an ornamental design. Front plate 1.1 is secured to tag body 1.2 by latch assembly 3.

In a second embodiment shown in FIGS. 2-10, identification assembly 2000 is provided. Identification assembly 2000 is shown in FIG. 2 in the closed position. As shown in FIG. 2, identification assembly 2000 has front plate 100 attached to tag body 200 by hinge assembly 500. Hinge assembly 500 is positioned at top surface 20 of tag body 200. Identification 2000 further has brackets 400A and 400B and levers 600A and 600B. Front plate 100 has front identification surface 10.

Figure 3:
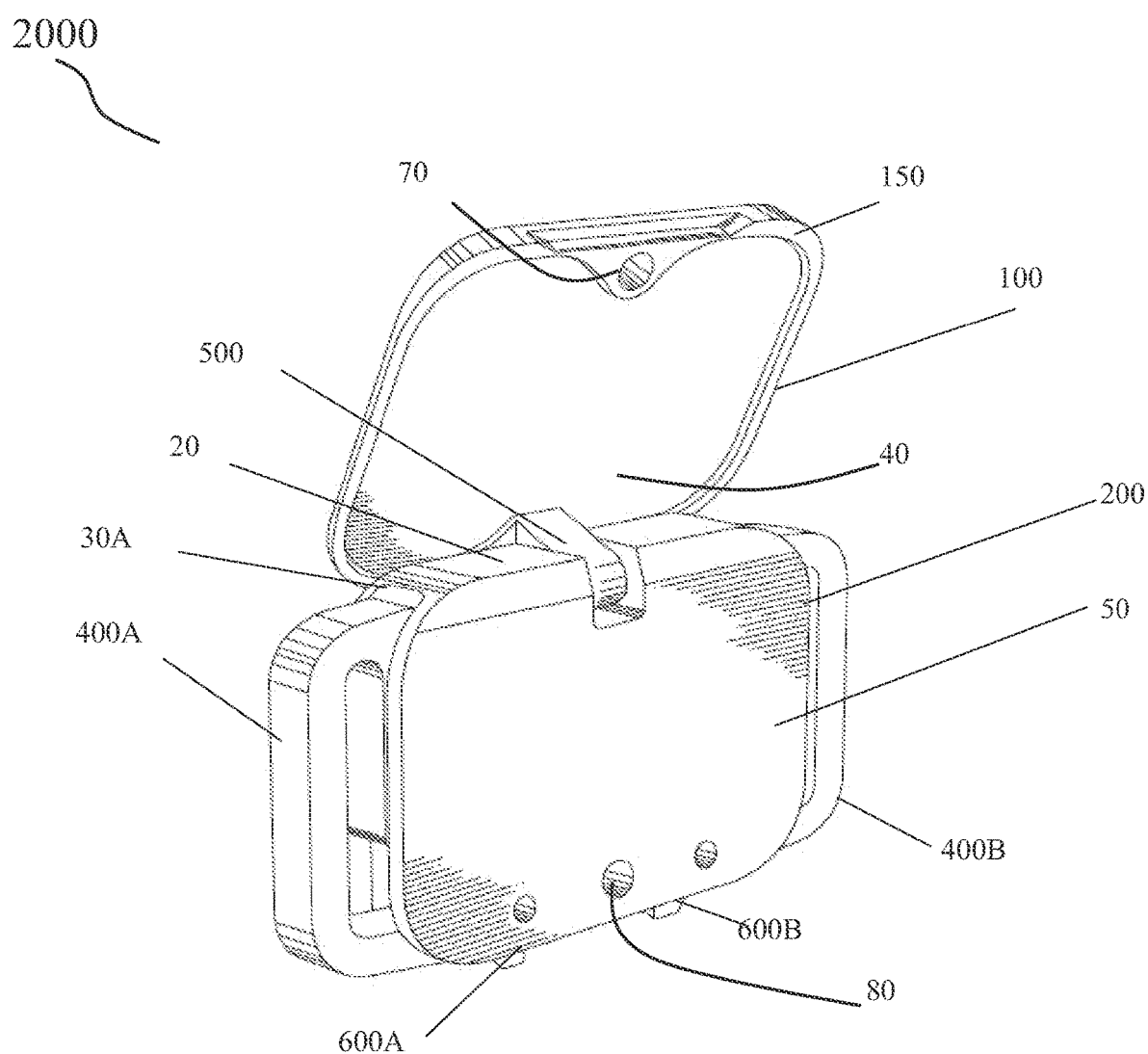
FIG. 3 provides a front view of an identification assembly in accordance with embodiments of the present invention.

Identification assembly 2000 is shown in FIG. 3 in the open position. In the open position, front plate 100 is rotated horizontally about hinge assembly 500 to reveal identification surface 50 on tag body 200. Identification assembly 2000 also has identification surface 40 on front plate 100. Identification surface 10 is opposite identification surface 40.

In some embodiments, and as shown in FIG. 3, front plate 100 may have front plate lip 150, also referred to herein simply as lip 150, extending perpendicularly from identification surface 40 of front plate 100. Lip 150 may effectively recess identification surface 40 such that when identification assembly 100 is in the closed position, as shown in FIG. 2, identification surface 40 does not come in to contact with identification surface 50. This recessed position of identification surface 40 advantageously ensures that information displayed on identification surface 40 and on identification surface 50 is not compromised by friction forces that occur during wear which may, over time, degrade the legibility of the information displayed on surfaces 40 and 50.

In some embodiments, identification surfaces 10, 40, and 50 may be engravable surfaces, enamel surfaces capable of displaying identification information, or identification surfaces 10, 40, and 50 may display information by being affixed with an information-containing label or by any other method capable of displaying information. One identification surface might display information in a different manner than another identification surface in the same identification assembly 2000. For example, an identification assembly may have an identification surface 10 engraved with an animal's name and may have an identification surface 50 affixed with a label displaying the animal's current medications. In a preferred embodiment, identification surfaces 10, 40, and 50 are engravable surfaces.

Referring again to FIG. 3, front plate 100 may have closure piece 70 positioned on or extending from identification surface 40. Tag body 200 may have corresponding closure piece 80 positioned on identification surface 50. Closure piece 70 may engage closure piece 80 to secure front plate 100 to tag body 200. For example, and in a preferred embodiment, closure piece 70 is a magnetic latch and closure piece 80 is a magnetic catch such that closure pieces 70 and 80 operate as a magnetic closure assembly. In other embodiments, front plate 100 may be secured to tag body 200 by other closure mechanisms, and for example, by a mechanical flexible one-piece flat spring latch, or by any other suitable fastener assembly.

Figure 4:
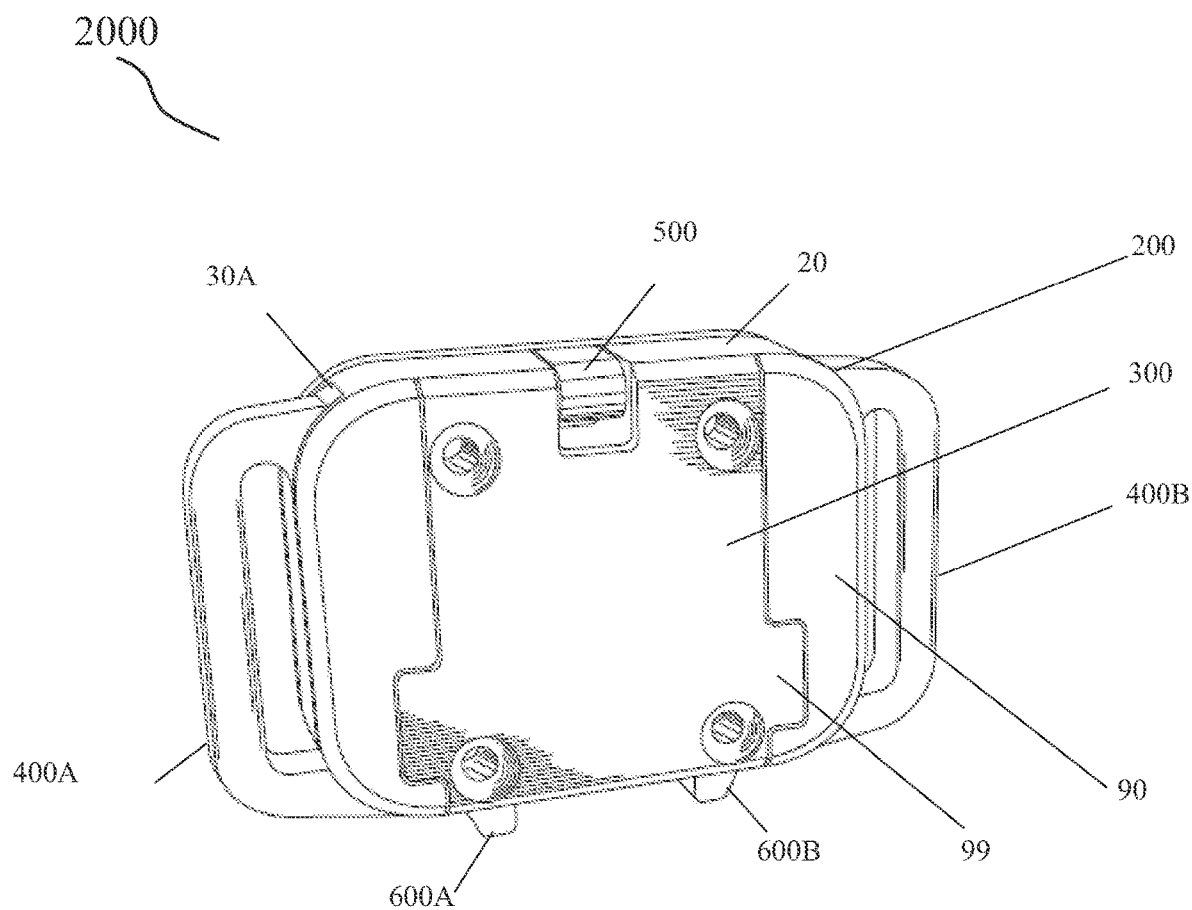
FIG. 4 provides a back view of an identification assembly in accordance with embodiments of the present invention.

Referring to FIGS. 2-4, identification assembly has brackets 400A and 400B, collectively referred to as a bracket assembly. Brackets 400A and 400B are removably received by a corresponding portion of tag body 200. For example, and as shown in FIGS. 2-4, bracket 400A is received by bracket receiving slot 30A of tag body 200. Levers 600A and 600B cooperate with brackets 400A and 400B respectively to engage and disengage brackets 400A and 400B from tag body 200.

Figure 5:
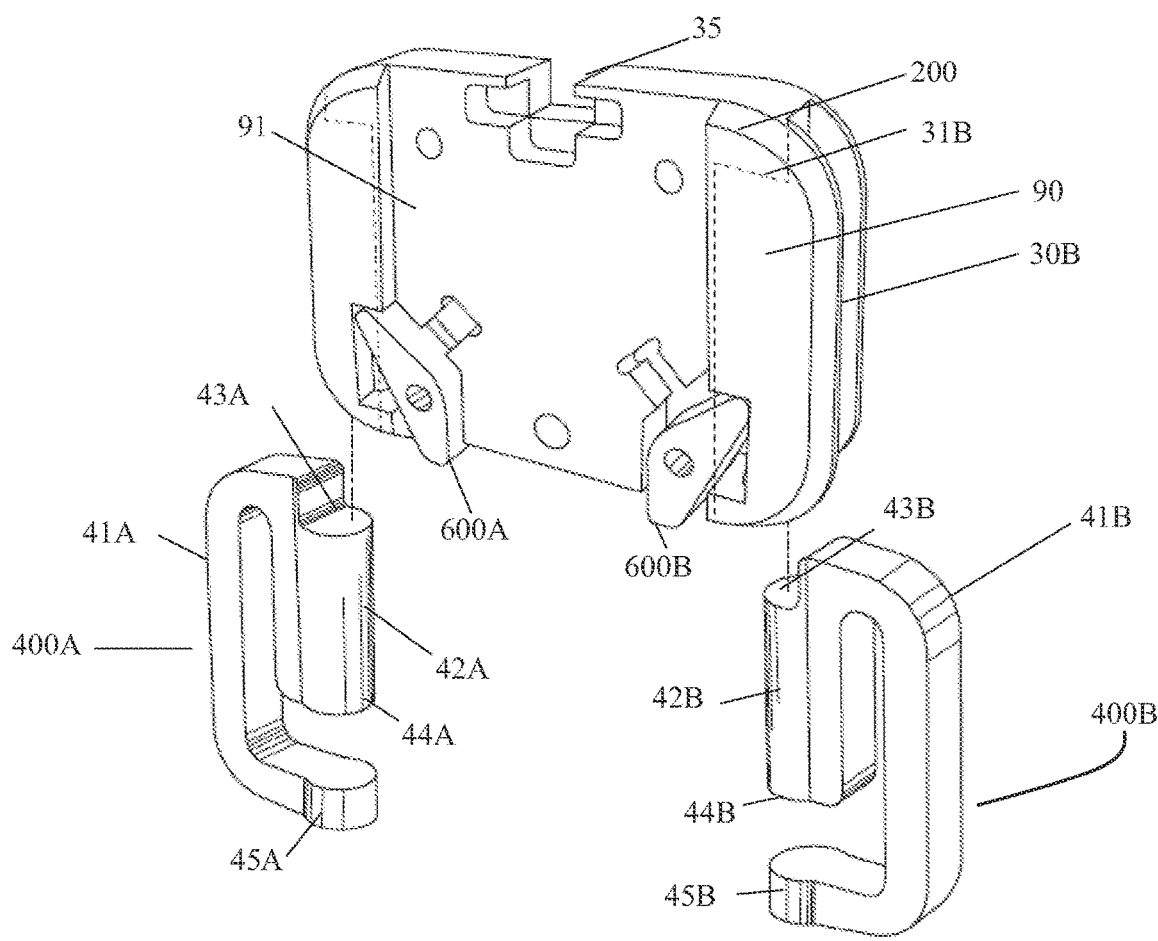
FIG. 5 provides a back view of an unassembled identification assembly in accordance with embodiments of the present invention.
Figure 6:
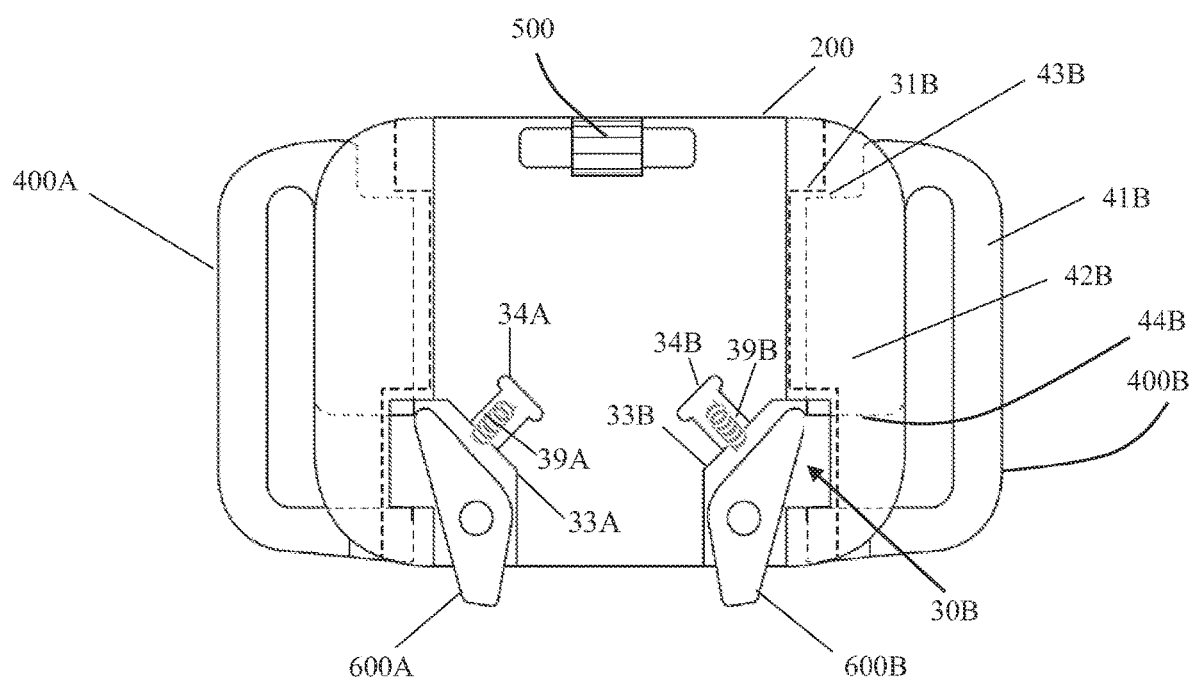
FIG. 6 provides a back view of an identification assembly in accordance with embodiments of the present invention.
Figure 7:
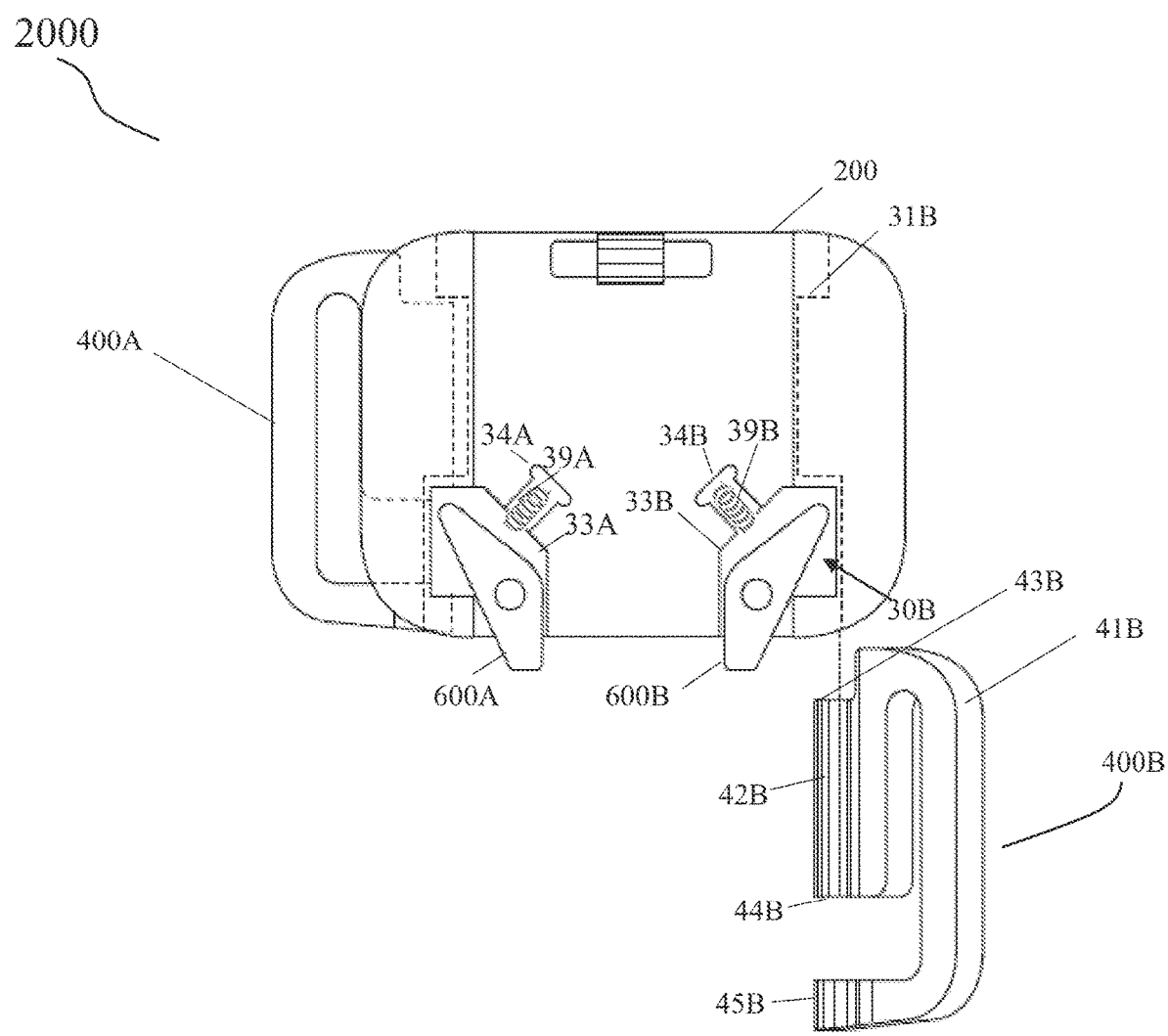
FIG. 7 provides a back view of a partially assembled identification assembly in accordance with embodiments of the present invention.
Figure 8:
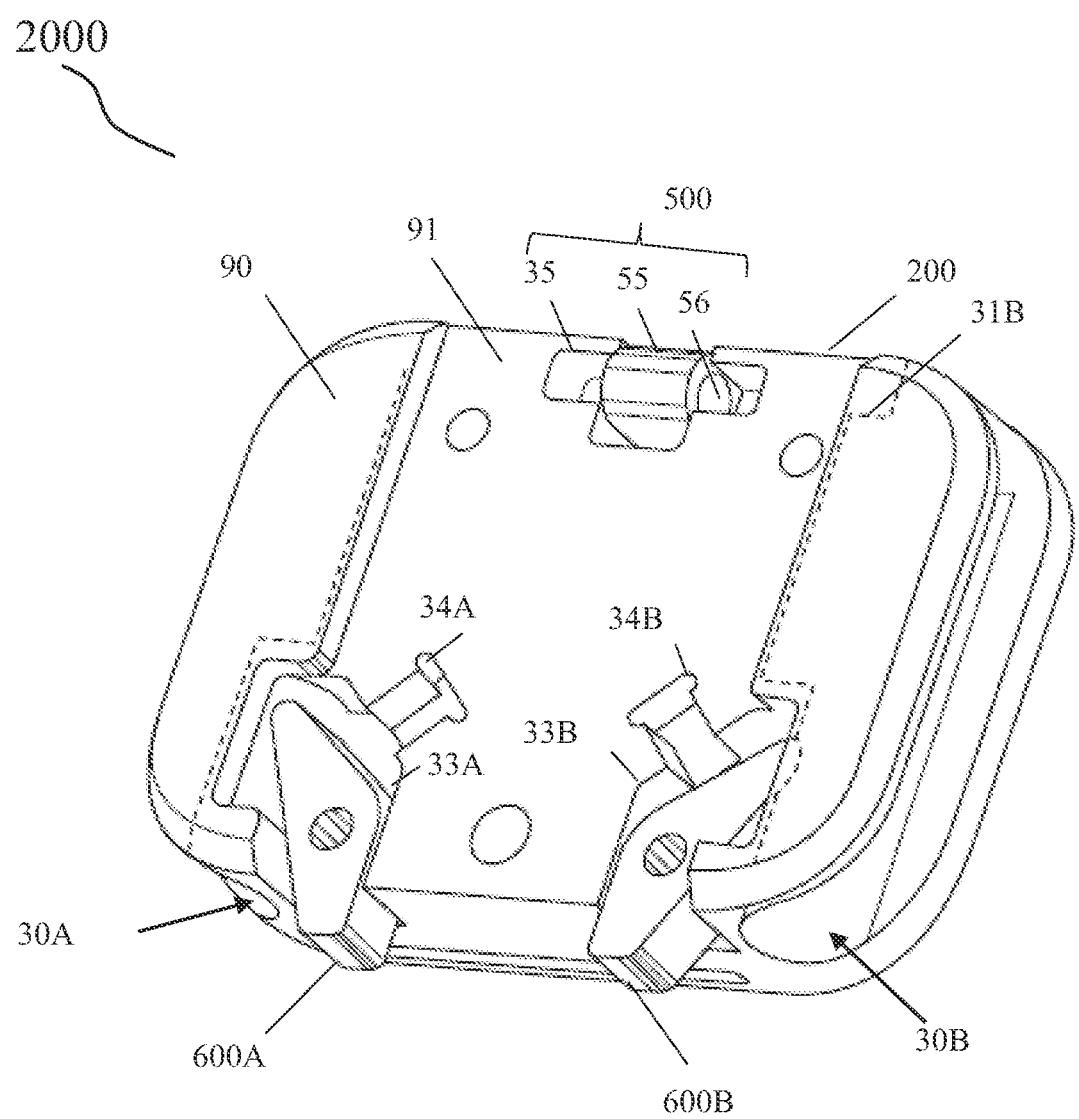
FIG. 8 provides a back view of a tag assembly in accordance with aspects and embodiments of the present invention.
Figure 9:
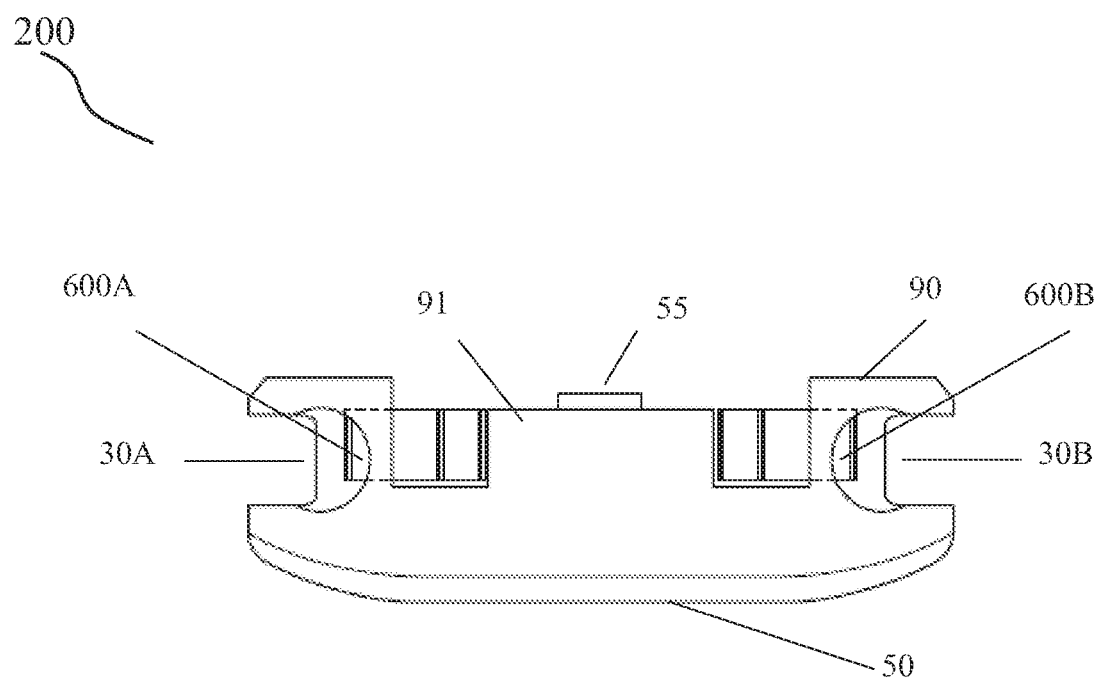
FIG. 9 provides a bottom view of a tag assembly in accordance with embodiments of the present invention.

The bracket receiving slots of tag body 200 receive internal bracket portions 42A and 42B of brackets 400A and 400B, as show in FIGS. 5-7. Internal bracket portions 42A and 42B have top surfaces 43A and 43B and bottom surfaces 44A and 44B. When internal bracket portions 42A and 42B are inserted in bracket receiving slots 30A and 30B respectively of tag body 200, top surfaces 43A and 43B of brackets 400A and 400B abut bracket stops 31A and 31B in bracket slots 30A and 30B. Bracket stops 31A and 31B are protrusions formed in tag body 200 that extend into bracket slots 30A and 30B that prevent internal bracket portions 42A and 42B from moving freely throughout the full space of slots 30A and 30B. External bracket portions 41A and 41B of brackets 400A and 400B remain outside of slots 30A and 30B regardless of the position of internal bracket portions 42A and 42B. End portions 45A and 45B of brackets 400A and 400B are in the same plane as internal bracket portions 43A and 43B. When brackets 400A and 400B are engaged by levers 600A and 600B, end portions 45A and 45B are fully received within bracket slots 30A and 30B. If, however, brackets 400A and 400B are only partially within bracket slots 400A and 400B such that top surfaces 43A and 43B are not abutting bracket stops 31A and 31B and levers 600A and 600B are not engaging bottom surfaces 44A and 44B, a portion or all of end portions 45A and 45B may be external to receiving slots 30A and 30B.

In accordance with embodiments, tag body 200 has back surfaces 90 and 91, as shown in FIG. 5. When assembled, surface 91 of tag body 200 is covered by backplate 99, as shown in FIG. 4. Surface 91 of tag body 200 forms lever recesses 33A and 33B and spring pockets 34A and 34B. Tag body 200 also defines hinge cavity 35. Levers 600A and 600B are seated in lever recesses 33A and 33B as shown in FIGS. 5-10. As shown in FIGS. 6-7, springs 39A and 39B are seated in spring pockets 34A and 34B. Springs 39A and 39B in spring pockets 34A and 34B exert pressure on levers 600A and 600B, causing levers 600A and 600B to extend into bracket receiving slots 30A and 30B. When brackets 400A and 400B are inserted into bracket receiving slots 30A and 30B, as shown in FIG. 6, levers 600A and 600B, when not engaged by external force, abut bottom surfaces 44A and 44B of internal bracket portions 42A and 42B. Levers 600 and bracket stops 31 therefore lock internal bracket portion 42 into a fixed position within bracket slot 30 and join bracket assembly 400 to tag body 200.

As shown in FIG. 7, brackets 400A and 400B can be disengaged from tag body 200 by exerting inward pressure on the levers. When lever 600B is engaged by exerted a force on it to compress spring 39B in spring pocket 34B, the force causes the lever to rotate counter-clockwise within lever recess 33B. The counter-clockwise rotation causes lever 600A to clear bracket receiving slot 30B, and thus it no longer abuts bottom surface 44B of internal bracket portion 42B. Internal bracket portion 42B is able to freely exit bracket receiving slot 30B and disengage from tag body 200.

Figure 10:
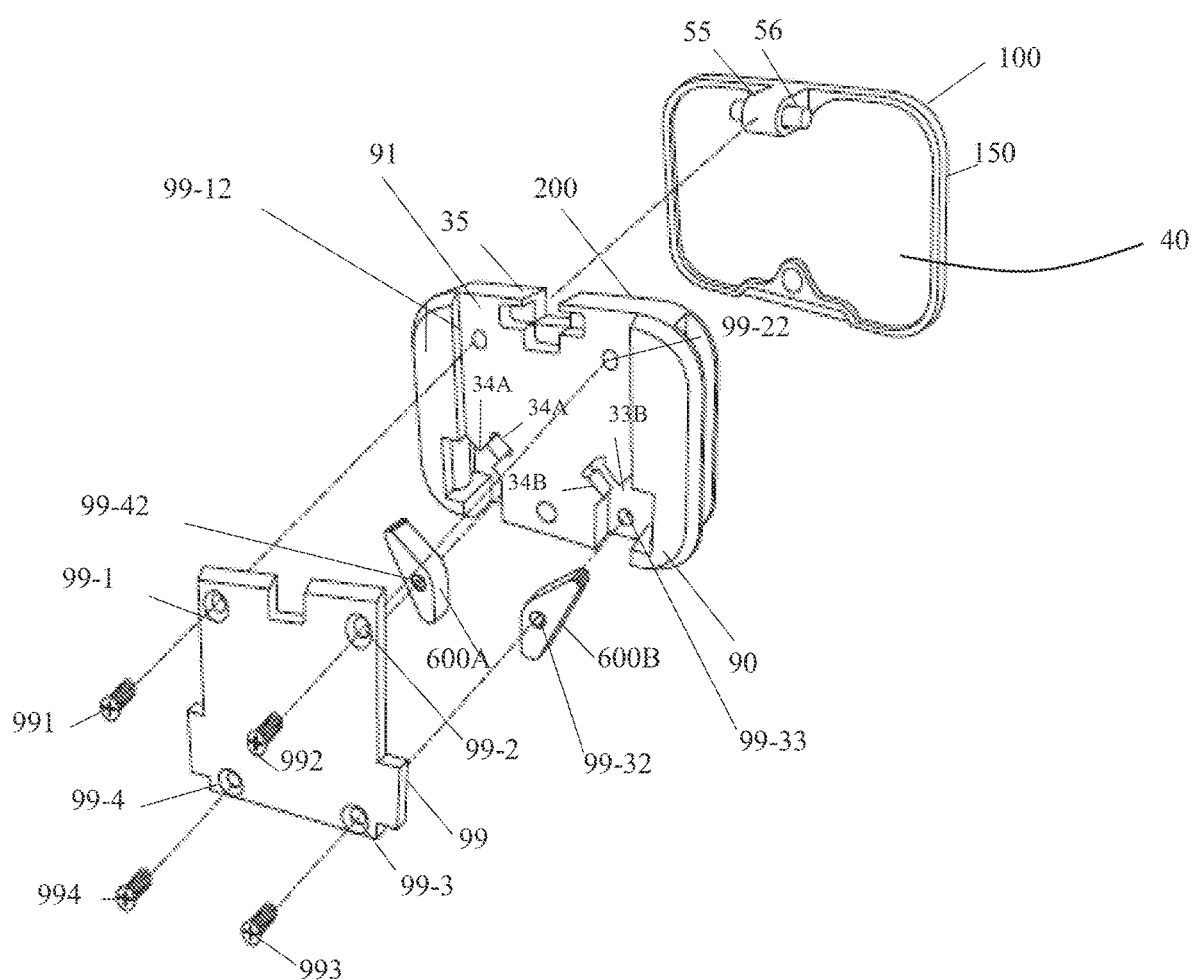
FIG. 10 provides an exploded view of a tag assembly in accordance with aspects and embodiments of the present invention.

In accordance with embodiments and referring to FIG. 10, a tag assembly is provided having backplate 99, tag body 200, hinge 55 and hinge pin 56, front plate 100, and brackets 400A and 400B. Front plate 100 has inner surface 40 and lip 150 extending perpendicular from inner surface 40. Hinge 55 extends perpendicularly from inner surface 40 and from lip 150. Front plate 100 rotates freely around hinge pin 56. Tag body 200 defines hinge cavity 35 that receives hinge 55 and hinge pin 56, thereby affixing front plate 100 to tag body 200.

Still referring to FIG. 10, in accordance with embodiments backplate 99 has throughholes 99-1, 99-2, 99-3 and 99-4. Throughholes 99-1, 99-2, 99-3, and 99-4 receive screws 991, 992, 993, and 994, respectively. Screws 991 and 992 are received in throughholes 99-12 and 99-22, respectively, on surface 91 of tag body 200. Screw 994 passes through lever 600A via throughhole 99-42 and is received in a throughhole (not shown) in lever recess 34A of tag body 200, and screw 993 passes through lever 600B via throughhole 99-32 and is received in throughout 99-33 in lever recess 34B of tag body 200. Screws 991, 992, 993, and 994 fix backplate 99 and levers 600A and 600B to tag body 200.

In another embodiment, a collar assembly is provided having a band and identification assembly. A band of flexible material, such as woven nylon or cotton fabric webbing may be connected to the identification assemblies disclosed herein and be worn by an animal. The collar portion may be replaced as desired. The collar may, for example, be replaced to provide fashionable variations to pet owners, or may simply be replaced when a given collar begins to show signs of wear. The collar may be replaced to accommodate an animal as it grows. Alternatively, the collar may have features that enable it to be adjusted to accommodate changes in pet size.

Figure 11:
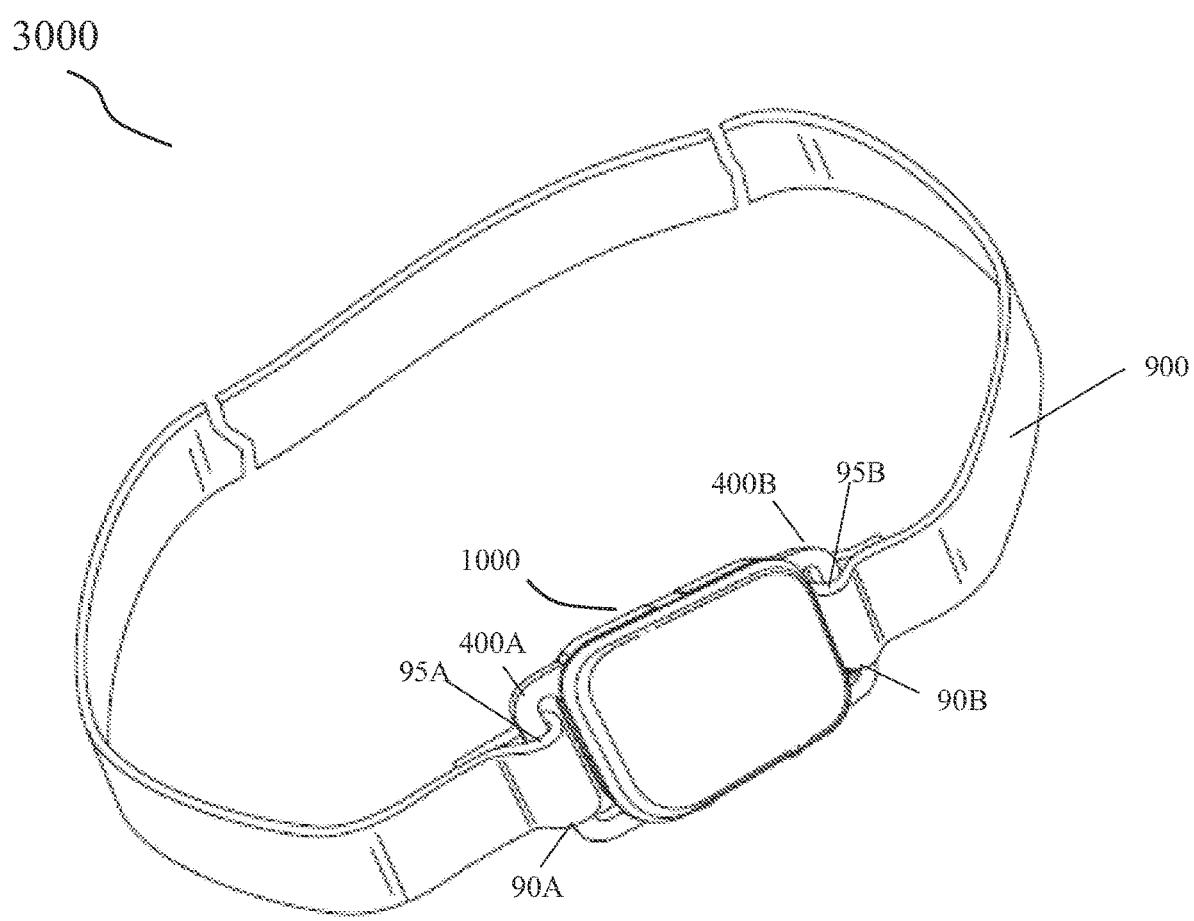
FIG. 11 provides a collar assembly in accordance with aspects and embodiments of the present invention.
Figure 12:
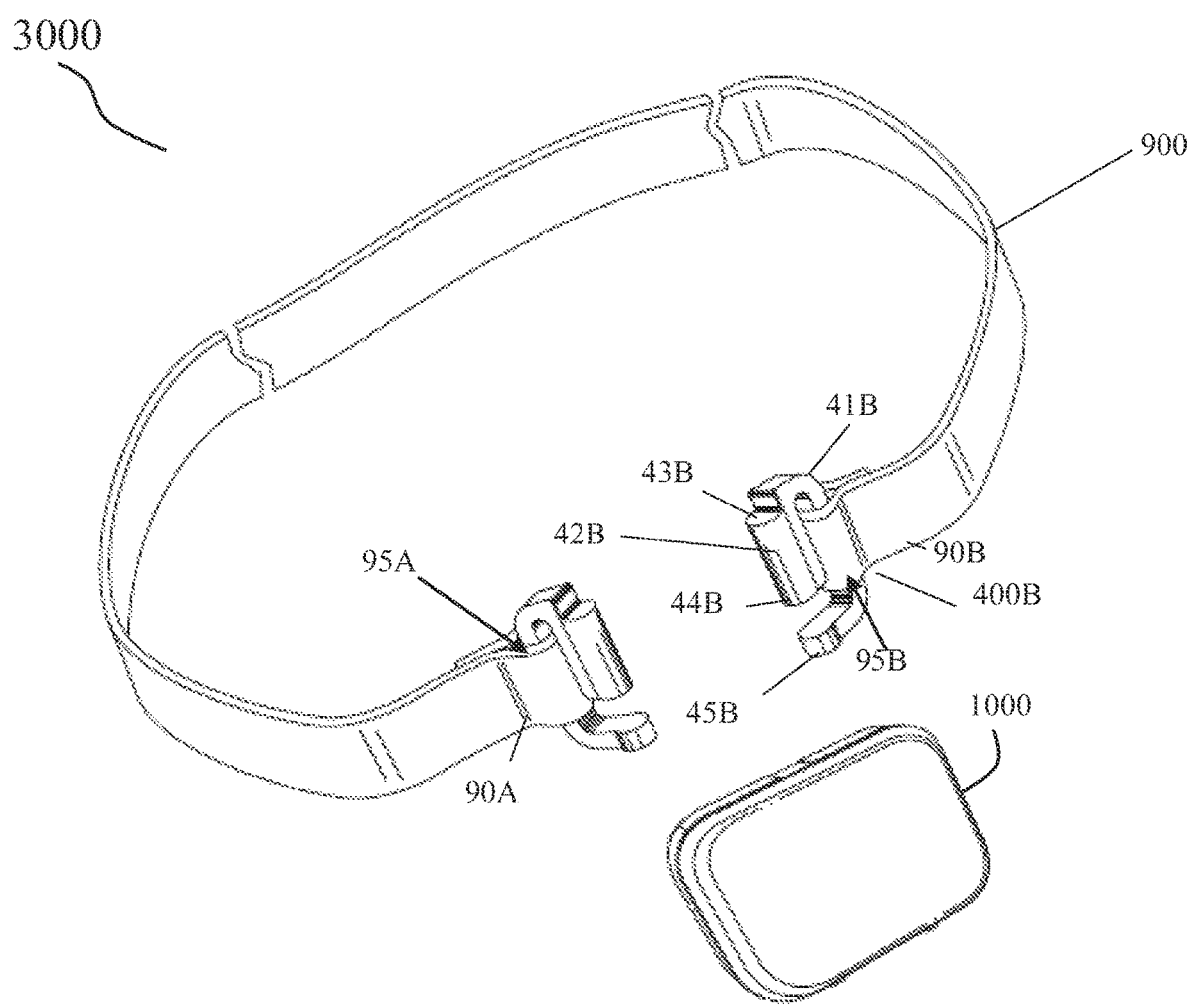
FIG. 12 provides an unassembled collar assembly in accordance with embodiments of the present invention.

In accordance with embodiments, a collar assembly 3000 having a band of flexible material 900, also referred to herein as a collar, cooperates with identification assembly 2000, as shown in FIGS. 11-12. Band 900 has first end 90A and second end 90B. First end 90A forms loop 95A and send end 90B forms loop 95B. Loop 95A cooperates with external bracket portion 41A of bracket 400A and loop 95B cooperates with external bracket portion 41B of bracket 400B to receive band end 90A and band end 90B. The combination of band 900, bracket 400A, tag body 200, and bracket 400B forms a continuous loop.

When a bracket is disengaged from the tag body, band 900 can advantageously be removed from the bracket by virtue of the unique bracket design of the present disclosure. This feature enables the band to be replaced to accommodate fashion updates, changes in size, and/or replacing bands that are showing signs of wear. As shown in FIG. 12, loop 95B is received on external bracket portion 41B. Loop 95B can, however, removed entirely from bracket 400B when bracket 400B is at least partially disengaged tag body 200 such that bottom portion 45B is external to bracket slot 30B and thus outside of tag body 200. Band 900 can then be removed from bracket 400B by sliding loop 95B down external bracket portion 41B of bracket 400B and off end portion 45B. The same sequence can be repeated on the opposite side, i.e., for bracket 400A and loop 94A to completely remove band 900 from identification assembly 1000.

Although certain representative embodiments and advantages have been described in detail, it will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only.

The invention claimed is:

1. An identification assembly comprising:
a tag assembly and a bracket assembly, the tag assembly comprising a front plate rotatably fixed to a tag body, the front plate having a first identification surface and a second identification surface, wherein the first identification surface is opposite the second identification surface and the tag body having a third identification surface;
wherein the tag body defines a tag body front side having a front width and a tag body back side having a back width, wherein the tag body back side and front side are joined by tag body side walls, the tag body side walls spaced from one another at a width less than the width of the front width and less than the width of the back width such that the tag body front side, the tag body side walls, and the tag body back side define a bracket slot on each side of the tag body;
wherein each bracket slot has a widthwise opening at a distal widthwise end of the tag body, the bracket assembly prevented from removal through the widthwise end;
the tag body configured to removably receive the bracket assembly in a lengthwise direction perpendicular to the widthwise end of the tag body;
wherein the bracket assembly comprises two brackets and wherein each bracket comprises a tag receiving portion and a collar receiving portion, the tag receiving portion having a top surface and a bottom surface and the tag receiving portion is configured to be received by the bracket slot defined by the tag body;
wherein the tag body further comprises a bracket stop that protrudes into each of the bracket slots defined by the tag body, the bracket stop configured to abut the top surface of the tag body receiving portion of each bracket; and wherein the tag body further comprises levers configured to protrude into each of the bracket slots and engage a bottom surface of the tag receiving portion of the bracket.

2. The identification assembly of claim 1, wherein the levers are configured to be disengageable from the bottom surface of the tag receiving portion of each of the brackets in the bracket slots such that the bracket can be removed from the tag body.

3. The identification assembly of claim 2, wherein the identification surfaces are engravable surfaces.

4. An identification assembly comprising a tag assembly and a bracket assembly, the tag assembly comprising a front plate rotatably fixed to a tag body, the front plate having two identification surfaces and the tag body having one identification surface, wherein the tag body is configured to removably receive the bracket assembly;

wherein the bracket assembly comprises two brackets and wherein each bracket comprises a tag receiving portion having a top surface and a bottom surface and the tag receiving portion is configured to be received by a bracket slot defined by the tag body;

wherein the tag body further comprises a bracket stop that protrudes into each of the bracket slots defined by the tag body, the bracket stop configured to abut the top surface of the tag body receiving portion of each bracket; and wherein the tag body further comprises levers configured to protrude into each of the bracket slots and engage a bottom surface of the tag receiving portion of the bracket.

5. The identification assembly of claim 4, wherein the levers are configured to be disengageable from the bottom surface of the tag receiving portion of each of the brackets in the bracket slots such that the bracket can be removed from the tag body.

6. The identification assembly of claim 4, wherein the identification surfaces are engravable surfaces.

* * * * *